Dec. 30, 1958 T. J. FLAMM 2,866,510
COMBINED BUMPER AND PUMP MOUNTING FOR TRACTORS
Filed April 4, 1957

Inventor
Thomas J. Flamm
By Charles L. Schwab
Attorney

United States Patent Office 2,866,510
Patented Dec. 30, 1958

2,866,510

COMBINED BUMPER AND PUMP MOUNTING FOR TRACTORS

Thomas J. Flamm, Springfield, Ill., assignor to Allis-Chalmers Manufacturing Company, Milwaukee, Wis.

Application April 4, 1957, Serial No. 650,699

3 Claims. (Cl. 180—53)

This invention relates to a hydraulic system for a tractor type vehicle and is more particularly concerned with the novel assembly and mounting for such a system.

In an effort to conserve space, more satisfactorily distribute weight and to achieve a more compact hydraulic system for a tractor vehicle, it has been found desirable to support the reservoir for the hydraulic fluid on the front portion of the vehicle's main frame adjacent to a front mounted vehicle driven pump. Heretofore, such arrangements have not been entirely satisfactory for several reasons. For example, in vehicles having forward mounted radiators, the conventional type of forward mounted reservoir assembly tends to interfere with the air flow therethrough. Also, in any type of conventional front installation, the reservoir and pump assemblies are susceptible to severe damage unless adequately protected by reinforced radiator guards or other types of protective structure. This conventional type of protective structure may succeed in protecting the hydraulic system from damage but in so doing, the reservoir and pump assemblies are rendered extremely inaccessible.

It is therefore an object of the present invention to provide a compact hydraulic system which overcomes the objections and disadvantages hereinbefore described, in an entirely satisfactory manner.

It is a further object of this invention to provide a forward mounted reservoir assembly for a tractor vehicle serving as a container for a supply of hydraulic fluid for the hydraulic system as well as a thrust transmitting means wherein the reservoir assembly defines a bumper for the tractor vehicle.

It is a further object of this invention to provide a detachable forward mounted reservoir bumper assembly for a hydraulic system which houses the hydraulic pump.

It is a further object of this invention to provide a front mounted hydraulic system including a bumper reservoir assembly, a pump assembly, and control valve group arranged as a unitary structure.

These and other objects and advantages of this invention will be apparent from the following description when read in conjunction with the annexed drawings, in which.

Figure 1:
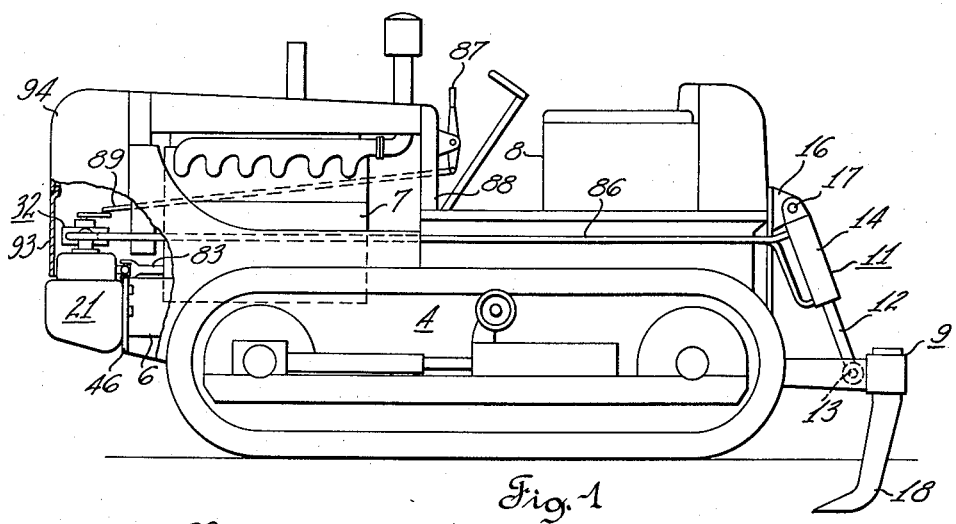
Figure 1 is a side view of a crawler tractor having a front portion cut away exposing the full side view of the bumper assembly.

Referring to Fig. 1, a conventional type crawler tractor 4 has a main frame 6 on which is mounted an engine 7, forwardly of the operator's station 8. Pivotally mounted at the rear of the main frame 6, is a ripper attachment 9 which is controlled by a hydraulic motor means 11 that includes a double acting ram 12 being pivotally mounted by pin 13 on the ripper 9, and a cylinder 14 pivotally mounted on bracket 16 by pin 17. Motor means 11, being interposed between the ripper 9 and the tractor 4, is operative to raise and lower the ripper teeth 18 into and out of ground working engagements in the conventional manner.

Figures 2, 3:
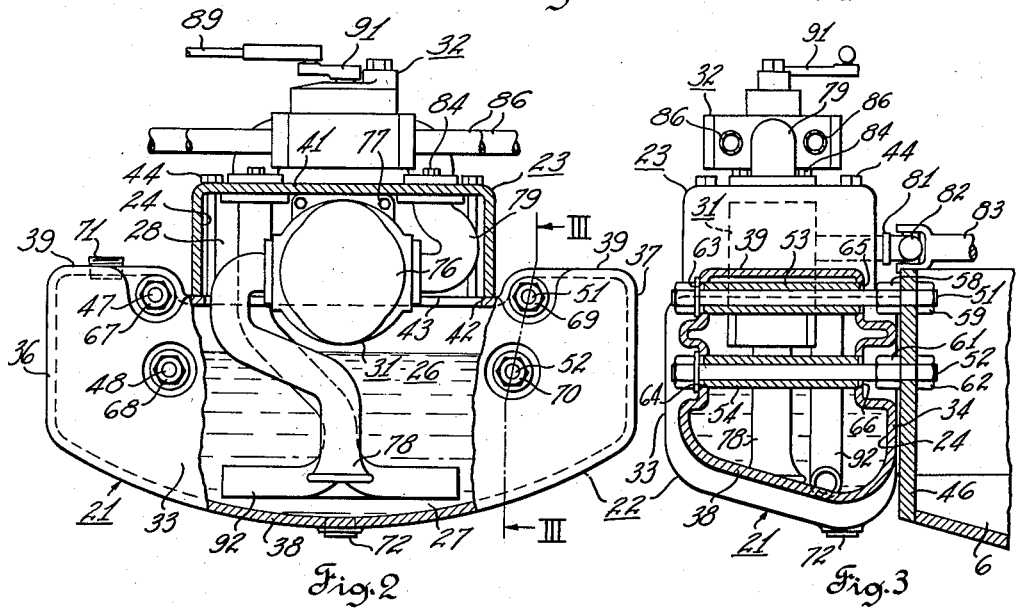
Figure 2 shows a front view of the bumper reservoir assembly having a portion of the casing cut away to expose the hydraulic pump assembly.
Figure 3 is a section view taken along line III—III of Fig. 2 and shows the construction for the attaching means.

Referring now to Figs. 1, 2, and 3, the reservoir bumper assembly 21 is intended to be part of the hydraulic system for all of the fluid motor operated implements mounted on the crawler tractor 4. In the preferred construction, the reservoir bumper assembly 21 is comprised of two adjoined castings 22, 23 that form a hollow fluid tight casing 24 extending transversely of the longitudinal axis of vehicle 4, and which provides a chamber 26, having a lower portion 27, for holding a supply of hydraulic fluid and an upper portion 28 for housing the hydraulic pump assembly 31 in addition to providing a support for the control valve group 32.

The first casting 22 has a vertically disposed front wall 33 and rear wall 34 in spaced relationship from each other and extending transversely of the longitudinal axis of vehicle 4; laterally spaced sidewalls 36, 37; a bottom wall 38; and a portion 39 of the top wall 41 there being an upwardly faced opening 42 provided therein. The walls 33, 34, 36, 37, 38, 39, 41, are rigidly interconnected and form a continuous structure. The second casting 23 is best described as resembling a rectangular boxlike structure having an open bottom 43 which corresponds in size to opening 42. Casting 23 in effect forms the other portion of the top wall 41 and defines an upper portion 28 of chamber 26. Casting 23 is detachably connected to casting 22 by a plurality of cap screws 44 (portions of which are shown best in Fig. 2) which are piloted through bores provided in the top of casting 23 and are received into threaded engagement with bores (not shown) provided in top portion 39 of casting 22. Casting 23 is fitted against casting 22 so that the opening 42 in the top of casting 22 coincides with the open bottom 43 of casting 23 resulting in a continuous fluid tight connection.

Referring to Figs. 2 and 3, the bumper reservoir assembly 21 is detachably mounted on the front portion 46 of the main frame 6 by fastening means including two pair of studs or tension members 47, 48, and 51, 52. It is to be understood studs 47, 48, and 51, 52 are all of similar construction and cooperate with the bumper reservoir assembly in the same manner and only studs 51 and 52 will be described in detail. Studs 51 and 52 pass through sleeves 53 and 54 respectively and are fixedly secured to portion 46 by threaded fasteners 58, 59, and 61, 62 respectively. Sleeves 53 and 54 are best described as hollow cylinders which are welded at opposite ends respectively into bores 63, 64 provided in the front wall 33 and with bores 65, 66 provided in rear wall 34, as is best shown in Fig. 3. Bore 63 is aligned with bore 65 and bore 64 with bore 66 on axes which are transverse with respect to front and rear walls 33 and 34. Sleeves 53, 54 serve two purposes. First, they provide a fluid tight passage through the reservoir bumper assembly for receiving the fastening means 51 and 52, and second, they act as a reinforcing means which adds rigidity to the casing and are operative to transmit thrust between the front wall 33 and rear wall 34. Studs 47 and 48 cooperate with a pair of sleeves (not shown) which are of the same construction and perform the same function as described for sleeves 53 and 54.

Threaded fasteners or nuts 67, 68, 69, and 70 cooperate respectively with studs 47, 48, 51, and 52 to releasably retain bumper reservoir assembly 21 on portion 46. Rear wall 34 abuts portion 46 of main frame 6 and is in thrust transmitting relationship therewith. A filling plug 71 is provided in portion 39 for adding hydraulic fluid to the reservoir and a drain plug 72 is provided in the bottom wall 38 to permit draining of the hydraulic fluid.

Referring again to Figs. 1, 2, and 3, other elements of the hydraulic system include a hydraulic pump assembly 31, a control valve group 32, and fluid operated motor mechanisms such as the double acting hydraulic ram 12 and cylinder 14 for the ripper attachment 9.

The pump assembly 31 includes a housing 76 which is mounted in upper portion 28 being fixedly attached to the rear inside portion of casting 23 by cap screws 77. Other structure includes a suction line 78 through which hydraulic fluid is drawn into the pump 31 and a pressure line 79 through which fluid is delivered to the control valve group 32 in the conventional manner. The pump 31 is vehicle driven having an input shaft 81 connected by a universal joint 82 to a power take-off unit, which is generally indicated by reference character 83, which in turn is driven by engine 7.

Control valve group 32 is of conventional construction, being fixedly connected adjacent the pump 31 on top of casting 23 by cap screws 84 and being in fluid communication with the pump 31 through the pressure line 79. Conduit means 86 interconnect the control valve group 32 and cylinder 14 and carry hydraulic fluid therebetween. A conventional type hand actuated lever 87 is pivotally mounted on the control panel 88 and is controllable from the operator's station 8. Linkage means 89 of conventional design and construction is pivotally connected to lever 87 at one end and pivotally connected at the opposite end to lever arm 91 of the valve group 32 for transmitting motion to a main control valve (not shown) to which lever arm 91 is attached. The main valve (not shown) of the control valve group 32, in response to an adjustment of lever 87, is operative to divert hydraulic fluid to the various hydraulic motor mechanisms, such as cylinder 14, in the conventional manner which is well understood by those familiar with the art. Valve group 32 also includes a return line 92 which returns fluid from the hydraulic system to the chamber 26, this function also being well understood. The control valve group 32 is located so as to be readily accessible for servicing, requiring only the removal of removable screen 93 of the radiator guard 94.

It will be apparent from the drawings and the foregoing detailed description, that a novel design and construction for a reservoir bumper assembly 21 has been illustrated wherein the reservoir serves as a front bumper for a crawler tractor 4 as well as a chamber 26 for holding a supply of hydraulic fluid. In addition, the pump assembly 31 is housed within the upper portion 28 of the bumper reservoir chamber 26 and the control valve group 32 is attached to the casing 24 adjacent to and in fluid communication with the pump 31 which provides an extremely compact structure for the hydraulic system.

The two casting construction is preferred since by simply detaching casting 23 from casting 22 the pump assembly 31 and the control valve group 32 can be readily removed for servicing. It will also be noted that the entire bumper reservoir assembly 21 can be easily removed by simply disconnecting nuts 67, 68, 69, and 70. These features also simplify the assembly operation. The bumper reservoir assembly may also be fabricated from steel plates which are merged or interconnected by welding, which construction would be entirely satisfactory.

Although only one embodiment of the invention has been illustrated and described herein, it is not intended to limit the patent granted hereon otherwise than is necessitated by the scope of the appendant claims.

What is claimed is:

1. In combination with a tractor vehicle having a main frame; a hydraulic system comprising a bumper reservoir assembly formed by first and second castings defining a hollow fluid tight reservoir, said first casting having vertically disposed front and rear walls, laterally spaced side walls, a bottom wall and a top wall presenting a first opening, said second casting being detachably connected to said first casting so as to cover said opening and define an upper portion of said reservoir, said second casting having an opening in the bottom thereof juxtaposed with said first opening whereby the interior of said second casting communicates with the interior of said first casting; reinforcing means connecting said front and rear walls for transmitting thrust therebetween; attaching means for detachably connecting said first casting to said main frame, said rear wall abutting the forward portion of said main frame in thrust transmitting relationship thereto; a vehicle driven pump mounted within said second casting and having fluid communication with said reservoir; a control valve group mounted on top of said second casting in fluid communication with said pump.

2. In combination with a tractor vehicle having a main frame; a hydraulic system for fluid motor operated implements mounted on said vehicle, said hydraulic system comprising: a bumper reservoir assembly formed by an upper and lower casing, a first opening provided in the top portion of said lower casing, a second opening corresponding to said first opening provided in the bottom of said upper casing, means for fixedly interconnecting said upper and lower casings having said first opening juxtaposed with said second opening whereby the interior of said upper casing communicates with the interior of said lower casing and defines a hollow fluid tight reservoir, said reservoir extending transversely of the longitudinal axis of said tractor vehicle, attaching means for detachably connecting said lower casing in thrust transmitting relationship to said main frame; and a hydraulic pump mounted within said upper casing and having fluid communication with said reservoir.

3. In combination with a tractor vehicle having a main frame, a hydraulic system comprising: a bumper reservoir assembly formed by an upper and lower casing, a first opening provided in the top portion of said lower casing, a second opening provided in the bottom portion of said upper casing, releasable means for detachably connecting said upper casing in fixed relationship on said lower casing and having said second opening juxtaposed with said first opening whereby the interior of said upper casing communicates with the interior of said lower casing to define a hollow fluid tight reservoir, said reservoir extending transversely of the longitudinal axis of said tractor vehicle, attaching means for detachably connecting said lower casing in thrust transmitting relationship to said main frame; and a hydraulic pump mounted within and secured to said upper casing and having fluid communication with said reservoir, said pump being removable with said upper casing upon release of said releasable means.

References Cited in the file of this patent

UNITED STATES PATENTS

| Number | Name | Date |
|---|---|---|
| 1,486,222 | Berry | Mar. 11, 1924 |
| 1,745,705 | Norquist | Feb. 4, 1930 |
| 1,995,088 | Bellamy | Mar. 19, 1935 |
| 2,055,690 | Hott et al. | Sept. 29, 1936 |
| 2,074,469 | Haynes | Mar. 23, 1937 |
| 2,099,789 | Baker et al. | Nov. 23, 1937 |
| 2,325,729 | Allin | Aug. 3, 1943 |
| 2,402,449 | Rockwell | June 18, 1946 |
| 2,546,565 | Schneider | Mar. 27, 1951 |
| 2,629,328 | Ladd | Feb. 24, 1953 |